US012676969B2

(12) United States Patent
Zhang et al.

(10) Patent No.: US 12,676,969 B2
(45) Date of Patent: Jul. 7, 2026

(54) SYSTEMS AND METHODS FOR IMAGE FILTERING

(71) Applicant: ZHEJIANG DAHUA TECHNOLOGY CO., LTD., Hangzhou (CN)

(72) Inventors: Xue Zhang, Hangzhou (CN); Cheng Fang, Hangzhou (CN); Dong Jiang, Hangzhou (CN); Jucai Lin, Hangzhou (CN); Jun Yin, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 250 days.

(21) Appl. No.: 18/398,333

(22) Filed: Dec. 28, 2023

(65) Prior Publication Data

US 2024/0137506 A1 Apr. 25, 2024
US 2024/0236313 A9 Jul. 11, 2024

Related U.S. Application Data

(63) Continuation of application No. PCT/CN2022/101189, filed on Jun. 24, 2022.

(30) Foreign Application Priority Data

Jun. 30, 2021 (CN) .......................... 202110736810.3

(51) Int. Cl.
*H04N 19/176* (2014.01)
*G06T 3/40* (2006.01)
(Continued)

(52) U.S. Cl.
CPC .............. *H04N 19/117* (2014.11); *G06T 3/40* (2013.01); *H04N 19/176* (2014.11);
(Continued)

(58) Field of Classification Search
CPC .. H04N 19/117; H04N 19/176; H04N 19/186; H04N 19/59; H04N 19/70; H04N 19/80; H04N 19/40
(Continued)

(56) References Cited

U.S. PATENT DOCUMENTS

2015/0131748 A1 5/2015 Ono et al.
2019/0230354 A1 7/2019 Kim
(Continued)

FOREIGN PATENT DOCUMENTS

CN 109600611 A 4/2019
CN 110555342 A 12/2019
(Continued)

OTHER PUBLICATIONS

International Search Report in PCT/CN2022/101189 mailed on Sep. 15, 2022, 4 pages.
(Continued)

*Primary Examiner* — Nguyen T Truong
(74) *Attorney, Agent, or Firm* — METIS IP LLC

(57) ABSTRACT

The present disclosure provides systems and methods for image filtering. The method may include obtaining an initial image block from a reconstructed image; determining at least one candidate image block by performing a filtering operation on the initial image block using at least one trained machine learning model; and determining a target image block based on the at least one candidate image block.

20 Claims, 10 Drawing Sheets

<u>100</u>

(51) Int. Cl.

| | |
|---|---|
| *H04N 19/117* | (2014.01) |
| *H04N 19/186* | (2014.01) |
| *H04N 19/59* | (2014.01) |
| *H04N 19/70* | (2014.01) |
| *H04N 19/80* | (2014.01) |

(52) U.S. Cl.
CPC ........... *H04N 19/186* (2014.11); *H04N 19/59* (2014.11); *H04N 19/70* (2014.11); *H04N 19/80* (2014.11)

(58) Field of Classification Search
USPC ..................................................... 375/240.29
See application file for complete search history.

(56) References Cited

U.S. PATENT DOCUMENTS

| | | | |
|---|---|---|---|
| 2020/0154145 A1 | 5/2020 | Du et al. | |
| 2020/0236349 A1* | 7/2020 | Zhai .................... | H04N 19/105 |
| 2020/0252654 A1 | 8/2020 | Su et al. | |
| 2021/0012537 A1 | 1/2021 | Xu et al. | |
| 2021/0021823 A1 | 1/2021 | Na et al. | |
| 2021/0409783 A1 | 12/2021 | Wan et al. | |
| 2022/0109833 A1 | 4/2022 | Choi et al. | |

FOREIGN PATENT DOCUMENTS

| | | |
|---|---|---|
| EP | 3849195 A1 | 7/2021 |
| WO | 2019201239 A1 | 10/2019 |
| WO | 2021051369 A1 | 3/2021 |
| WO | 2023274074 A1 | 1/2023 |

OTHER PUBLICATIONS

Written Opinion in PCT/CN2022/101189 mailed on Sep. 15, 2022, 5 pages.

First Office Action in Chinese Application No. 202110736810.3 mailed on Mar. 3, 2022, 26 pages.

Wang, Hongtao et al., EE: Tests on Neural Network-based In-Loop Filter, MPEG Meeting, 2020, 9 pages.

Wang, Hongtao et al., AHG11: Neural Network-based In-Loop Filter Performance with No Deblocking Filtering stage, JVET Meeting, 2021, 5 pages.

Liu, Chao et al., A Convolutional Neural Network-Based Low Complexity Filter, Arxiv.Org, Cornell University Library, 2020, 13 pages.

Yat Lam et al., AHG11: Content-adaptive Neural Network Post-processing Filter, JVET Meeting, 2021, 6 pages.

The Extended European Search Report in European Application No. 22831888.7 mailed on Aug. 23, 2024, 11 pages.

* cited by examiner

200

Figure 3:
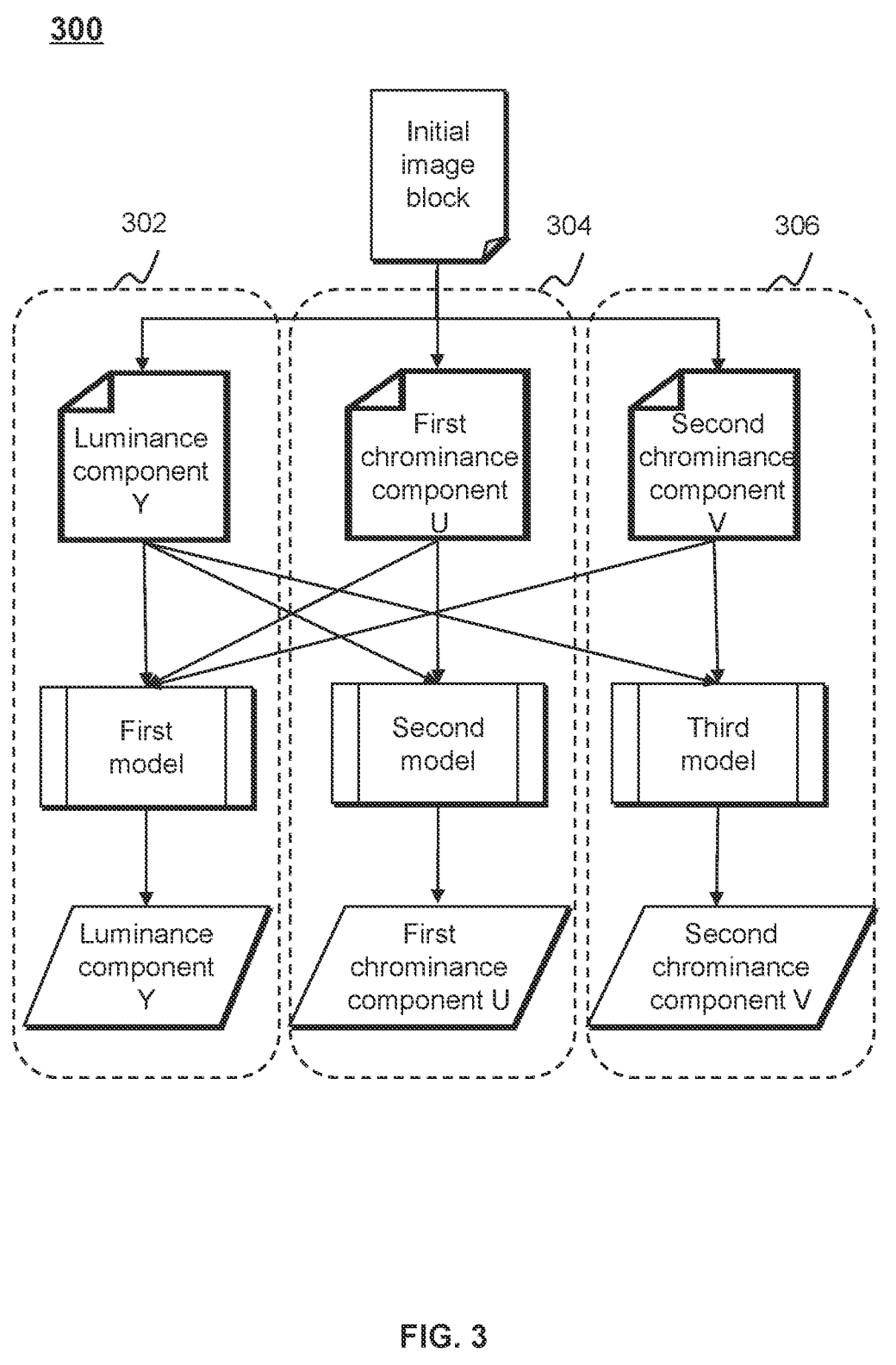

300

Initial image block 302    304    306

Luminance component Y

First chrominance component U

Second chrominance component V

First model

Second model

Third model

Luminance component Y

First chrominance component U

Second chrominance component V

SYSTEMS AND METHODS FOR IMAGE FILTERING

CROSS-REFERENCE TO RELATED APPLICATIONS

This application is a continuation of International Patent Application No. PCT/CN2022/101189, filed on Jun. 24, 2022, which claims priority to Chinese Patent Application No. 202110736810.3 filed on Jun. 30, 2021, the contents of which are incorporated herein by reference in their entirety.

TECHNICAL FIELD

The present disclosure generally relates to the field of video processing technology, and in particular, to systems and methods for image filtering.

BACKGROUND

With the development of the video production industry, and the continuous upgrading of video shooting tools and network communication technologies, video coding technologies are also updated and iterated rapidly. In the field of video coding, the amount of video image data may be relatively large, and video image data usually needs to be compressed. The compressed data may be called a code stream (also be referred to as a video code rate). The video code stream may be transmitted to a user terminal through a wired or wireless network and be decoded for watching. A video coding process may include processes such as a block division process, a prediction process, a transformation process, a quantization process, a coding process, etc. In some embodiments, the video coding process may include applying an image filtering technique. Therefore, it is desirable to provide a method for image filtering to improve the efficiency and effectiveness of video coding.

SUMMARY

According to an aspect of the present disclosure, a method is provided. The method includes obtaining an initial image block from a reconstructed image; determining at least one candidate image block by performing a filtering operation on the initial image block using at least one trained machine learning model; and determining a target image block based on the at least one candidate image block.

In some embodiments, before performing a filtering operation on the initial image block using at least one trained machine learning model, the method includes obtaining a size of a convolution kernel, a convolution step size, and a count of convolution kernel layers in the at least one trained machine learning model; and expanding a size of the initial image block based on the size of the convolution kernel, the convolution step size, and the count of convolution kernel layers in the at least one trained machine learning model.

In some embodiments, the expanding a size of the initial image block includes expanding the size of the initial image block using pixels in the reconstructed image that around the initial image block. In some embodiments, if the pixels in the reconstructed image that around the initial image block are not obtained, the method includes expanding the size of the initial image block using pixels of the initial image block closest to pixels to be filled.

In some embodiments, the initial image block includes at least two of a luminance component, a first chrominance component, or a second chrominance component. The at least one trained machine learning model includes a first model configured to, in response to that the initial image block is composed of the luminance component, the first chrominance component, and the second chrominance component, output a luminance component of the at least one candidate image block; a second model configured to, in response to that the initial image block is composed of the luminance component and the first chrominance component, output a first chrominance component of the at least one candidate image block; and a third model configured to, in response to that the initial image block is composed of the luminance component and the second chrominance component, output a second chrominance component of the at least one candidate image block.

In some embodiments, the initial image block includes the luminance component, the first chrominance component, and the second chrominance component, and the at least one trained machine learning model is configured to output the luminance component, the first chrominance component, and the second chrominance component of the at least one candidate image block.

In some embodiments, the method further includes dividing the luminance component of the initial image block into multiple sub-luminance components; and inputting the multiple sub-luminance components into one or more input channels of the at least one trained machine learning model, wherein a sampling rate of each of the multiple sub-luminance components matches with a sampling rate of the first chrominance component or the second chrominance component of the initial image block.

In some embodiments, the method further includes upsampling the first chrominance component and the second chrominance component of the initial image block so that a sampling rate of the first chrominance component and the second chrominance component of the initial image block matches a sampling rate of the luminance component of the initial image block; or downsampling the luminance component of the initial image block so that the sampling rate of the luminance component of the initial image block matches the sampling rate of the first chrominance component or the second chrominance component of the initial image block.

In some embodiments, the at least one trained machine learning model includes at least one first convolution unit configured to determine a first characteristic image block based on the initial image block; at least one connection unit configured to determine a second characteristic image block by processing the first characteristic image block and connecting, through a residual connection, an input and an output of the at least one connection unit; and at least one second convolution unit configured to determine a third characteristic image block based on the second characteristic image block. The at least one candidate image block is generated by connecting, through the residual connection, the third characteristic image block and the initial image block.

In some embodiments, the at least one connection unit includes at least one third convolution unit.

In some embodiments, the connecting, through the residual connection, the third characteristic image block and the initial image block includes determining a scaling factor; and connecting, through the residual connection, the third characteristic image block and the initial image block based on the scaling factor.

In some embodiments, the determining the scaling factor includes determining the scaling factor by comparing costs of a plurality of candidate factors.

In some embodiments, the at least one trained machine learning model is determined based on an image quality parameter.

In some embodiments, the image quality parameter includes a quantization parameter (QP).

In some embodiments, whether to apply the at least one trained machine learning model to the initial image block is included in a syntax switch.

According another aspect of the present disclosure, a method for image coding is provided. The method may include obtaining pixel values of a current image block; filtering the pixel values of the current image block using at least one trained machine learning model; and coding the current image block with a syntax switch that controls whether the at least one trained machine learning model is applied to the current image block.

In some embodiments, before coding the current image block based on the filtered pixel values, the method may further include determining a rate-distortion cost of the filtered pixel values of the current image block; and in response to a determination that the rate-distortion cost is less than a threshold or less than a rate-distortion cost of other filtering techniques, assigning a value to the switch syntax, the value indicating that the at least one trained machine learning model is applied to filter the current image block.

According to yet an aspect of the present disclosure, a system is provided. The system includes at least one storage device storing executable instructions for image filtering and at least one processor in communication with the at least one storage device. When executing the executable instructions, the at least one processor is configured to cause the system to perform operations including obtaining an initial image block from a reconstructed image; determining at least one candidate image block by performing a filtering operation on the initial image block using at least one trained machine learning model; and determining a target image block based on the at least one candidate image block.

According to yet another aspect of the present disclosure, a non-transitory computer readable medium is provided. The non-transitory computer readable medium comprise at least one set of instructions for image filtering. When executed by at least one processor of a computing device, the at least one set of instructions direct the at least one processor to perform operations including obtaining an initial image block from a reconstructed image; determining at least one candidate image block by performing a filtering operation on the initial image block using at least one trained machine learning model; and determining a target image block based on the at least one candidate image block.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 3 is schematic diagram illustrating an exemplary a process for performing a filtering operation on an initial image block using a trained machine learning model according to some embodiments of the present disclosure;

DETAILED DESCRIPTION

Figure 1:
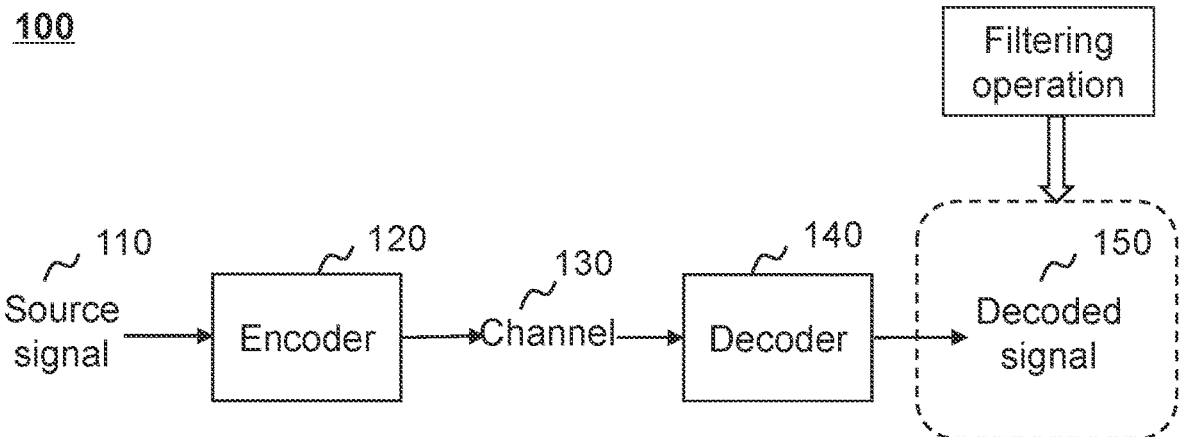
FIG. 1 is a schematic diagram illustrating an exemplary video processing system according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms "system," "engine," "unit," "module," and/or "block" used herein are one method to distinguish different components, elements, parts, sections, or assemblies of different levels in ascending order. However, the terms may be displaced by other expressions if they may achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

FIG. 1 is a schematic diagram illustrating an exemplary video processing system according to some embodiments of the present disclosure.

In some embodiments, a video processing system 100 for image filtering of a video may be applied to a video compression system, such as an air television broadcasting system, a cable television transmission system, a satellite television transmission system, an Internet video transmission system, a digital video stored in media, or the like. As used herein, video compression may refer to the reduction of the amount of data required to present a video, which aims at reducing redundant information of video data, thereby storing and transmitting the video data effectively.

As shown in FIG. 1, the video processing system 100 may include a source signal 110, an encoder 120, a channel 130, a decoder 140, and a decoded signal 150.

In some embodiments, the source signal 110 may include a source signal of a video, which is shortly referred to as a video source. In some embodiments, the video source may include various uncompressed dynamic images, such as dynamic images with a digital video format.

During video data processing, inter frame prediction may include compressing video data by removing spatial redundant information based on a strong correlation between adjacent pixels in the same frame. In some embodiments, the inter frame prediction may be implemented by the encoder 120 and the decoder 140.

In some embodiments, the encoder 120 may refer to a first compression standard of the video source implemented by software and/or hardware applications. The encoder 120 may be configured to compress the video source signal in a transmission end.

In some embodiments, the decoder 140 may refer to a second compression standard of the video source implemented by software or hardware applications. The decoder 140 may be configured to reconstruct an approximation of the video source in a receiving end for playback.

In some embodiments, the encoder 120 may be configured to perform a transformation and/or quantization operation on residual information generated by the inter frame prediction. The residual information after the transformation and/or quantization operation may be transmitted to a decoding end through entropy coding. The decoder 140 may extract the residual information generated by the inter frame prediction from information (e.g., the residual information after the entropy coding) transmitted by the encoder 120, and determine a reconstructed value based on a prediction value of motion estimation.

In some embodiments, the channel 130 may include a wireless channel, a wired channel, or a frequency band that is used to transmit or store encoded video data. For example, the channel 130 may include a twisted pair, a cable, an optical fiber, or a medium capable of transmitting an electromagnetic wave, etc.

In some embodiments, the decoded signal 150 may refer to data (i.e., video data after being encoded and decoded) reconstructed from the source signal 110 after being encoded and decoded. In some embodiments, the video data after being encoded and decoded may include a plurality of pixels each of which has a pixel value. A filtering operation may be performed on the decoded signal 150. As used hereby, the filtering operation may refer to a process for adjusting pixel values of pixels in a reconstructed image, which can reduce the distortion of the reconstructed image, thereby improving the quality of the reconstructed image.

In some embodiments, the encoded video data (i.e., the compressed/encoded video source signal) may be stored in a storage device (e.g., a hard disk), and the encoded video data may be read from the storage device during a subsequent decoding processing process.

In some embodiments, the video processing system 100 may further include a channel encoder. The channel encoder may refer to a device or program that is configured to further encode the encoded source signal in the transmission end before the source signal is transmitted in the channel 130, thereby improving an error correction function. In some embodiments, the video processing system 100 may include a channel decoder. The channel decoder may be configured to detect and correct an error caused by the transmission of the encoded source signal in the receiving end. The encoded source signal may be decompressed by the decoder 140.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 2:
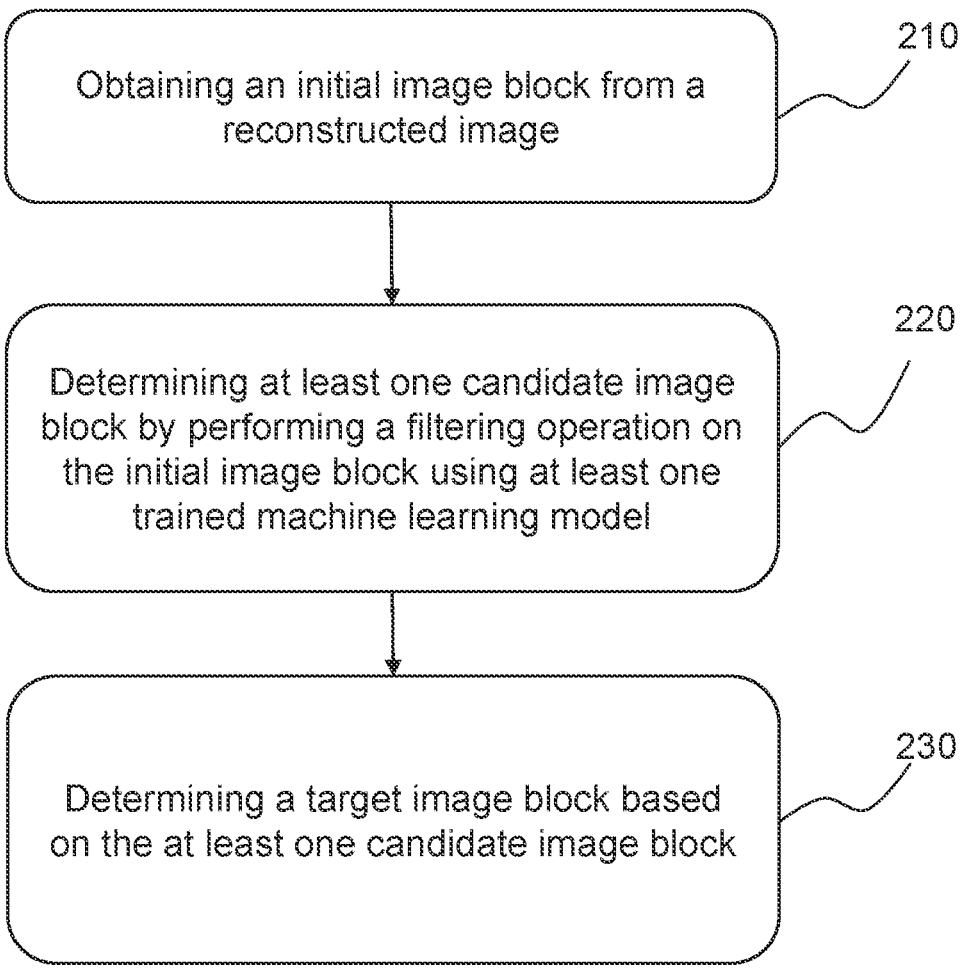
FIG. 2 is a flowchart illustrating an exemplary process for image filtering according to some embodiments of the present disclosure.

FIG. 2 is a flowchart illustrating an exemplary process for image filtering according to some embodiments of the present disclosure. In some embodiments, the process 200 may be implemented by an image filtering system (e.g., an image filtering system 900 illustrated in FIG. 9). In some embodiments, the image filtering system may be implemented by software and/or hardware, and/or may be integrated into an image filtering device (e.g., an image filtering device 1000 illustrated in FIG. 10) that includes a processing device (e.g., a processing device 1010). In some embodiments, at least part of the process 200 may be performed by the processing device including at least one processor and a storage device (e.g., a storage 1020). For example, the process 200 may be stored in the storage device in the form of instructions (e.g., an application), and invoked and/or executed by the processing device. The operations of the illustrated process presented below are intended to be illustrative. In some embodiments, the process 200 may be accomplished with one or more additional operations not described, and/or without one or more of the operations discussed. Additionally, the order in which the operations of the process 200 as illustrated in FIG. 2 and described below is not intended to be limiting. As shown in FIG. 2, a process 200 may include the following operations.

In 210, an initial image block may be obtained from a reconstructed image. In some embodiments, the operation 210 may be performed by an acquisition module 910.

The reconstructed image may be divided into a plurality of image blocks. The initial image block may be one or more image blocks in the reconstructed image.

In some embodiments, a part of image blocks of the reconstructed image may be selected as the initial image block(s) based on a first preset rule. Further, an image block of the reconstructed image that include pixels satisfying the first preset rule may be determined as the initial image block. For example, the first preset rule may be that a pixel value of each pixel in an image block satisfies a preset value. In some embodiments, the preset value may be satisfied that a pixel value of each pixel in an image block is greater than, less than, or equal to a threshold.

In 220, at least one candidate image block may be determined by performing a filtering operation on the initial image block using at least one trained machine learning model. In some embodiments, the operation 220 may be performed by a first determination module 920.

The candidate image block may be used to determine a target image block. In some embodiments, the candidate image block may be represented by YUV.

In some embodiments, each pixel in the at least one candidate image block may include at least one of a luminance component, a first chrominance component, or a second chrominance component.

The luminance component may be represented by Y, which is used to represent luminance or luma. That is, the luminance component may be a gray value.

The first chrominance component and the second chrominance component may be represented by U and V (i.e., $C_b$ and $C_r$), respectively, which are used to represent chrominance or chroma, respectively. Each luminance component Y may correspond to a chrominance component $C_b$ and a chrominance component $C_r$. Each chrominance component may correspond to one luminance component. The chrominance component may illustrate a color and saturation of an image, which is configured to designate a color of a pixel. A block that includes luminance components of pixels in a candidate image block may also referred to as a luminance block of the candidate image block. A block that includes chrominance components of pixels in a candidate image block may also referred to as a chrominance block of the candidate image block. For example, a block that includes first chrominance components of pixels in a candidate image block may also referred to as a first chrominance block of the candidate image block; a block that includes second chrominance components of pixels in a candidate image block may also referred to as a second chrominance block of the candidate image block. Each luminance block may correspond to a first chrominance block and a second chrominance component. Each chrominance component may correspond to one luminance component.

In some embodiments, the filtering operation may be used to suppress noises of the target image block while preserving the details of the target image block as much as possible.

In some embodiments, the image filtering operation may include a linear filtering operation and a non-linear filtering operation. Exemplary linear filtering operations may include a square filtering operation, a mean filtering operation, a Gaussian filtering operation, etc. Exemplary non-linear filtering operations may include a median filtering operation, a bilateral filtering operation, etc.

In some embodiments, the filtering operation may include a loop filtering operation. The loop filtering operation may include a process of adjusting one or more pixel values in the initial image block in the reconstructed image after an entire frame of an image is reconstructed. In some embodiments, the loop filtering operation may include applying a deblocking filter (DBF) technique, a sample adaptive offset (SAO) technique, an adaptive loop filter (ALF) technique, a cross-component adaptive loop filter (CCALF) technique, or the like, or any combination thereof.

In some embodiments, using the DBF technique, a blocking effect may be removed by filtering a block boundary (e.g., a block boundary of the initial image block) during a block coding process, thereby improving the subjective quality of the reconstructed image. Using the SAO technique, pixels in the reconstructed image may be classified and specific compensation values may be added to each type of pixel, thereby further improving image quality and solving problems such as color shift, loss of high-frequency information of the reconstructed image, or the like. Using the ALF technique, one or more filter coefficients may be obtained by applying the Wiener filtering (WF) technique using a diamond filter at the encoding end, and the luminance component and the chrominance component (e.g., the first or second chrominance component) may be filtered, thereby reducing image distortion. Using the CCALF technique, the chrominance component after being filtered using the ALF technique may be adjusted using the luminance component after being filtered using the WF technique as an adjustment value.

In some embodiments, the initial image block may be processed by a trained machine learning model for performing the filtering operation. The trained machine learning model may output a candidate image block corresponding to the initial image block. In some embodiments, the trained machine learning model may include a backbone and a residual connection from an input to an output of the trained machine learning model. The residual connection may cooperate with the backbone to perform the filtering operation on the initial image block. That is, using the trained machine learning model, the backbone may determine a residual image based on the residual connection. Since pixel values of the residual image are relatively small, the learning burden of the backbone may be reduced, thereby reducing complexity of the backbone and simplifying the filtering operation. In some embodiments, the trained machine learning model may include at least one first convolution unit, at least one connection unit, and at least one second convolution unit. More descriptions of determining the at least one candidate image block by performing the filtering operation on the initial image block using the at least one trained machine learning model may be found elsewhere in the present disclosure (e. g., FIGS. 3, 4, 5A, and 5B and the descriptions thereof).

In some embodiments, different candidate image blocks may be obtained by performing different filtering operations on different initial image block using different trained machine learning model. For example, multiple trained machine learning model with different convolution kernel sizes, different activation functions, etc., may be used to generate multiple candidate image blocks.

In some embodiments, the filtering operation may realize the noise reduction of an image (e.g., the candidate image block) and feature extraction of objects in the image (e.g., the candidate image block). The effect of the filtering operation may have a direct impact on the validity and reliability of subsequent image processing and analysis.

In 230, a target image block may be determined based on the at least one candidate image block. In some embodiments, the operation 230 may be performed by a second determination module 930.

The target image block may be part of image blocks determined from the at least one candidate image block based on a requirement of the subsequent image processing.

In some embodiments, the target image block may be determined from the at least one candidate image block based on a second preset rule. For example, a candidate image block with a smallest cost may be designated as the target image block.

It should be noted that the above descriptions are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 3 is schematic diagram illustrating an exemplary a process for performing a filtering operation on an initial image block using a trained machine learning model according to some embodiments of the present disclosure. A process 300 may include a first model process 302, a second model process 304, and a third model process 306. In some embodiments, the initial image block may be obtained as described in connection with operation 210 in FIG. 2.

In some embodiments, the initial image block may include at least two of a luminance component, a first chrominance component, or a second chrominance component. The trained machine learning model may include a first model, a second model, and a third model. A candidate image block may be determined by inputting the initial image block into the trained machine learning model. That is, the initial image block may be filtered using the trained machine learning model.

The first model may be configured to output a luminance component of the candidate image block in response to a determination that the initial image block is composed of the luminance component, the first chrominance component, and the second chrominance component. For example, the first model may be configured to perform a filtering operation on the luminance component of the initial image block based on the luminance component, the first chrominance component, and the second chrominance component of the initial image block to obtain and output the luminance component of the candidate image block. As shown in FIG. 3, in the first model process 302, the luminance component Y, the first chrominance component U, and the second chrominance component V of the initial image block may be inputted into the first model, and the first model may output the luminance component Y of the candidate image block.

The second model may be configured to output a first chrominance component of the candidate image block in response to a determination that the initial image block is composed of the luminance component and the first chrominance component. For example, the second model may be configured to perform a filtering operation on the first chrominance component of the initial image block based on the luminance component and the first chrominance component of the initial image block to obtain and output the first chrominance component of the candidate image block. As shown in FIG. 3, in the second model process 304, the luminance component Y and the first chrominance component U of the initial image block may be input into the second model, and the second model may output the first chrominance component U of the candidate image block.

The third model may be configured to output a second chrominance component of the candidate image block in response to a determination that the initial image block is composed of the luminance component and the second chrominance component. For example, the third model may be configured to perform a filtering operation on the second chrominance component of the initial image block based on the luminance component and the second chrominance component of the initial image block to obtain and output the second chrominance component of the candidate image block. As shown in FIG. 3, in the third model process 306, the luminance component Y and the second chrominance component V of the initial image block may be input into the third model, and the third model may output the second chrominance component V of the candidate image block. The candidate image block may be determined based on the luminance component Y, the first chrominance component U, and the second chrominance component V of the candidate image block.

Figure 4:
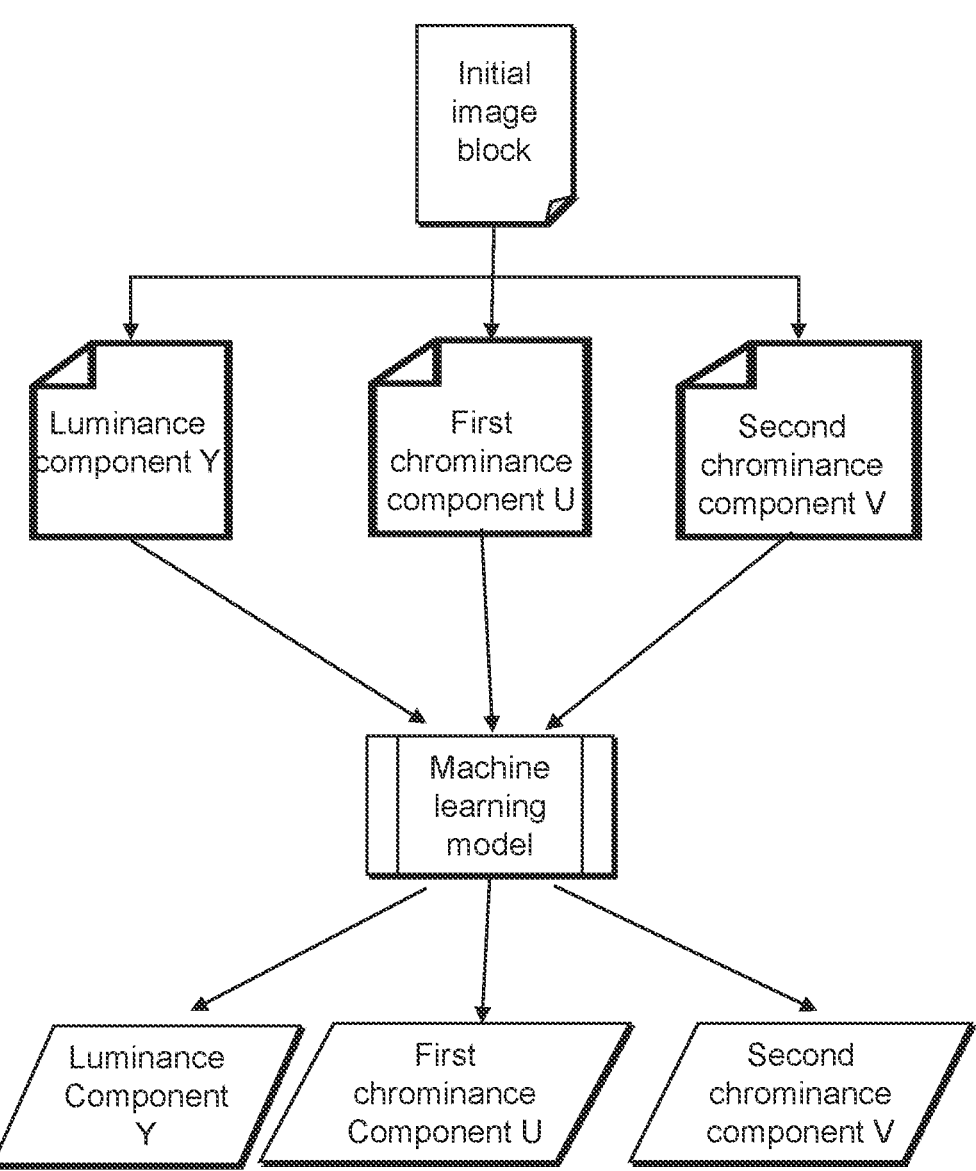
FIG. 4 is schematic diagram illustrating an exemplary a process for performing a filtering operation on an initial image block using a trained machine learning model according to some embodiments of the present disclosure.

FIG. 4 is schematic diagram illustrating an exemplary a process 400 for performing a filtering operation on an initial image block using a trained machine learning model according to some embodiments of the present disclosure.

In some embodiments, the initial image block may include a luminance component, a first chrominance component, and a second chrominance component. A candidate image block may be determined by inputting the initial image block into the trained machine learning model. That is, the initial image block may be filtered using the trained machine learning model. The trained machine learning model may be configured to output a luminance component, a first chrominance component, and a second chrominance component of the candidate image block. As shown in FIG. 4, the luminance component Y, the first chrominance component U, and the second chrominance component V of the initial image block may be inputted into the trained machine learning model, and the luminance component Y, the first chrominance component U, and the second chrominance component V of the corresponding candidate image block may be output.

According to some embodiments of the present disclosure, the trained machine learning model may realize the combination of cross-component information. By combining the luminance component and the chrominance component (e.g., the first or second chrominance component) of the initial image block inputted into the trained machine learning model, the structure of the trained machine learning model used for image filtering may be optimized, and the effect of image filtering may be improved.

Figure 5A:
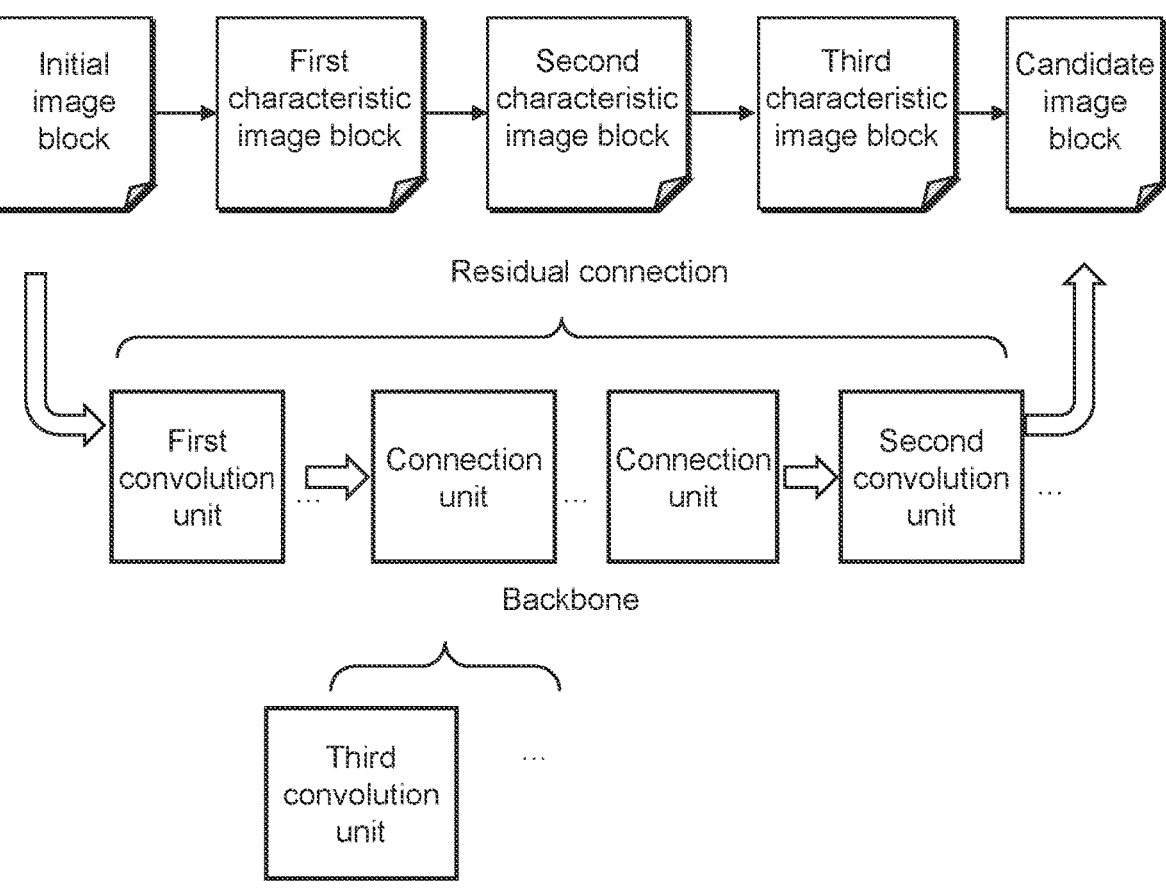
FIG. 5A is a schematic diagram illustrating an exemplary structure of a trained machine learning model according to some embodiments of the present disclosure.

FIG. 5A is a schematic diagram illustrating an exemplary structure of a trained machine learning model according to some embodiments of the present disclosure.

In some embodiments, the trained machine learning model may include at least one first convolution unit, at least one connection unit, and at least one second convolution unit.

In some embodiments, the convolution unit (e.g., the first or second convolution unit) may be configured to perform a convolution operation, which is composed of convolutional structures of convolutional neural networks (CNN). In some embodiments, the convolution unit may include an activation function to implement an activation operation. The activation function may include a Sigmoid function, a tan h function, a ReLU function, a LeakyReLU function, a PReLU function, a RReLU function, or the like.

The first convolution unit may be configured to determine a first characteristic image block based on the initial image block.

The first characteristic image block may be determined after the convolution and activation processing performed by the first convolution unit.

The connection unit may be configured to determine a second characteristic image block by processing the first characteristic image block. An input (e.g., the first characteristic image block) and an output (e.g., the second characteristic image block) of the connection unit may be connected through a first residual connection.

Figure 5B:
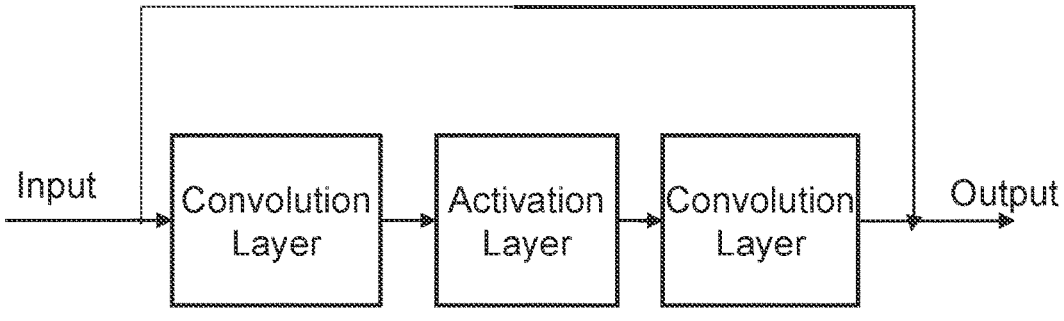
FIG. 5B is a schematic diagram illustrating an exemplary structure of a connection unit according to some embodiments of the present disclosure.

In some embodiments, the connection unit may include two convolution layers, an active layer, and the first residual connection from input of the connection unit to an output of the connection unit. FIG. 5B is a schematic diagram illustrating an exemplary structure of a connection unit according to some embodiments of the present disclosure. As shown in FIG. 5B, the connection unit may also include a convolution layer, an active layer, and a residual connection from input of the connection unit to an output of the connection unit. In some embodiments, the connection unit may also include more convolution layers and active layers, which is not limited herein. In some embodiments, each convolution layer may include a 3*3 convolution function (3*3*P*Q, wherein P and Q may represent a count of channels, and the values of P and Q may be the same or different), or the like, and the active layer may include a ReLU activation function, or the like, which is not limited herein.

The second characteristic image block may be a characteristic image block obtained by processing the first characteristic image block and connecting, through the first residual connection, an input and an output of the at least one connection unit. Specifically, the second characteristic image block may be determined based on the first characteristic image block and a residual image generated by the first residual connection.

In some embodiments, the at least one connection unit may include at least one third convolution unit.

The second convolution unit may be configured to determine a third characteristic image block based on the second characteristic image block. The second convolution unit may determine a prediction output of the trained machine learning model. The third characteristic image block may be determined by subtracting the prediction output from the initial image block. In some embodiments, a candidate image block may be generated by connecting, through a second residual connection, the third characteristic image block and the initial image block. Specifically, the candidate image block may be determined by adding the initial image block and the third characteristic image block together.

As shown in FIG. 5A, the trained machine learning model may be composed of a backbone and a residual connection from input to output. The backbone may be composed of multiple connection units, multiple first convolution units, and multiple second convolution units. One of the multiple connection units may be composed of the at least one third convolution unit and a residual connection (e.g., the first residual connection) from the input of the connection unit to the output of the connection unit.

In some embodiments, the connecting, through the second residual connection, the third characteristic image block and the initial image block may include determining a scaling factor and connecting, through the second residual connection, the third characteristic image block and the initial image block based on the scaling factor.

A residual connection (also be referred to as skip connection) may refer to express an output of a unit (e.g., the connection unit or the second convolution unit) as a linear superposition of an input of the unit and a non-linear transformation of the input.

The scaling factor may be used to adjust pixel value(s) of an input image block (e.g., the initial image block). The scaling factor may refer to a factor in a calculation process of scaling the pixel value(s) of the input image block.

The connecting the third characteristic image block and the input image block through the second residual connection to obtain a filtered image block (e.g., a candidate image block) corresponding to the input image block (e.g., the initial image block) may include determining a scaling factor, and determining the filtered image block (e.g., a candidate image block) corresponding to the input image block (e.g., the initial image block) by calculating a sum of the input image block and a product of the third characteristic image block and the scaling factor based on the second residual connection.

The trained machine learning model may require a size of input images (e.g., the initial image block) to be consistent. However, since the initial image block is in a YUV420 format (i.e., a pixel size of the luminance component Y:a pixel size of the first chrominance component U:one second chrominance component V=4:1:1), and four pixels of luminance component Y may correspond to one first chrominance component U and one second chrominance component V, therefore a scaling process may be needed.

In some embodiments, a scaling factor in a frame-level or a block-level may be used to adjust the output image of the trained machine learning model. For example, the scaling factor may be added to a residual image generated by subtracting the input image (e.g., the initial image block) of the trained machine learning model from the output image (e.g., the candidate image block) of the trained machine learning model. The residual image may be composed of several values, and the scaling factor may be regarded as a weight coefficient. In some embodiments, if a scaling factor in the frame-level is used to adjust the output image of the trained machine learning model, the residual image may need to be multiplied by the scaling factor in the frame-level, and a final output image may be determined based on the processed residual image and the input image of the trained machine learning model. In some embodiments, if a scaling factor in the block-level is used to adjust the output image of the trained machine learning model, that is, the scaling factor of each block may be different, the residual image may need to be divided into image blocks, each image block may be multiplied by the corresponding scaling factor of the image block, and a final output image may be determined based on the processed image blocks and the input image of the trained machine learning model.

In some embodiments, the scaling factor may be fixed or non-fixed. In some embodiments, for the scaling factor in the block-level, a degree of block scaling may vary depending on predetermined rules. For example, if a count of image blocks is less than 8×8, the scaling factor may be a fixed value. If a count of image blocks is greater than 8×8, the scaling factor may be another value. In some embodiments, if a transmitted video is involved, the scaling factor may be non-fixed. A most suitable scaling factor may be selected by performing an adaptive comparison operation. The adaptive comparison operation may include traversing a series of weight coefficients, and designating a weight coefficient with the smallest cost and/or the best effect as the scaling factor, so that the trained machine learning model may achieve a better filtering effect. In some embodiments, the scaling factor may need to be transmitted as a syntactic element.

In some embodiments, the determining the scaling factor may include determining the scaling factor by comparing costs of a plurality of candidate factors. Specifically, the plurality of candidate factors may be preset. All the candidate factors may be traversed to obtain the corresponding costs. The candidate factor with the smallest cost may be selected as the scaling factor.

According to some embodiments of the present disclosure, the trained machine learning model may include residual connection branches to reduce the training complexity of the backbone of the trained machine learning model. In some embodiments, by applying the scaling factor, the output of the trained machine learning model may be adjusted at a frame level or a block level through adaptive optimization adjustments.

In some embodiments, the trained machine learning model may be generated by training a preliminary machine learning model using a plurality of training samples. Each training sample may include a sample image and a reference image. The reference image may be determined by performing one or more filtering operations on the sample image. The sample image may serve as an input for training the preliminary machine learning model, and the reference image may serve as an output for training the preliminary machine learning model.

In some embodiments, the trained machine learning model may be determined based on an image quality parameter.

In some embodiments, the image quality parameter may include a quantization parameter (QP). Quantization may refer to a process of mapping a continuous value of a signal into a plurality of discrete amplitudes, which may realize the many-to-one mapping of the signal value. For example, the QPs may include 17, 22, 27, 32, 37, 42, etc. Different trained machine learning model may be generated based on different QPs. If the QP of the initial image block is 27, a trained machine learning model trained based on sample images with a QP of 27 may be used to process the initial image block with a QP of 27.

The QP may reflect details of spatial compression. When QP decreases, most of the details of an image (e.g., the initial image block) may be preserved, and a bit rate may increase. When QP increases, some details of the image may be lost, the bit rate may decrease, the image distortion may increase and the image quality may decrease. The QP may be a sequence number of a quantization step Qstep. When QP takes the minimum value of 0, a quantization degree may be the finest. Conversely, when QP takes the maximum value of 51, the quantization degree may be the roughest.

In some embodiments, for an initial image block with a specific QP, if there is no trained machine learning model that is trained based on sample images with the specific QP, a trained machine learning model corresponding to a QP closet the specific QP of the initial image block may be used to process the initial image block. For example, if the QP of the initial image block is 30, a trained machine learning model trained based on sample images with a QP of 32 may be used to process the initial image block with a QP of 30.

Merely by way of example, during the training process of the preliminary machine learning model, the plurality of sample images may be classified into different types each of which correspond to a QP or a QP range. The sample images in the same type may have the same QP or similar QPs that in the same QP range. Sample images with the same QP or the same QP range may be used as inputs of a specific preliminary machine learning model for training. Finally, different trained machine learning models corresponding to different QPs may be obtained. During a test process, image(s) may be filtered using a trained machine learning model whose corresponding QP is closest to the QP of the image(s).

According to some embodiments of the present disclosure, the trained machine learning model may be determined based on the image quality parameter. After residual data is transformed, a transformation coefficient may have a larger value range. Methods such as QP quantization, etc., may effectively reduce the value range of the signal to avoid distortion and obtain better compression effects.

In some embodiments, the at least one trained machine learning model may also be determined based on parameters other than the image quality parameter including QP, or the like.

Figure 6:
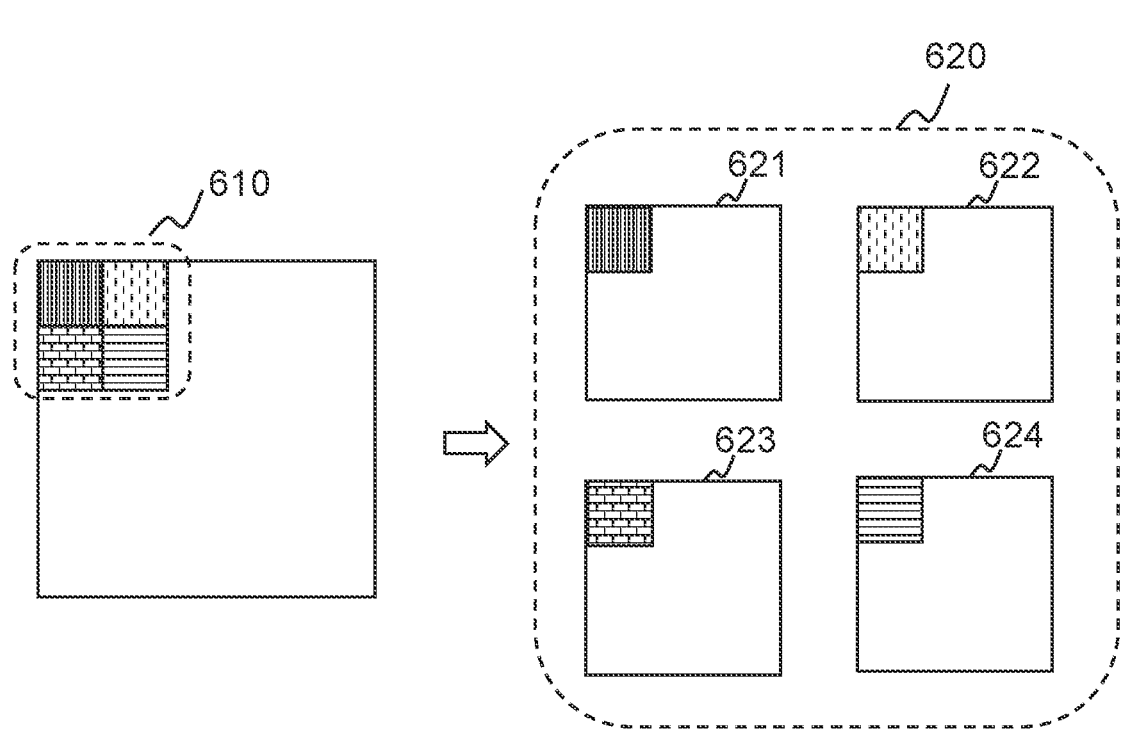
FIG. 6 is a schematic diagram illustrating a process for image size processing based on three components of YUV according to some embodiments of the present disclosure.

FIG. 6 is a schematic diagram illustrating a process for image size processing based on three components of YUV according to some embodiments of the present disclosure.

The initial image block obtained in operation 210 may be processed by applying a scaling process. In some embodiments, the scaling process may include reducing a size of a luminance component and increasing a size of a chrominance component (e.g., a first chrominance component U or a second chrominance component V).

In some embodiments, in the YUV420 format, a sampling rate of the luminance component may mismatch a sampling rate of the chrominance component (e.g., the first chrominance component and/or the second chrominance component), thereby affecting the filtering effect of a trained machine learning model. Thus, a matching operation may be performed on the sampling rates of the luminance component and the chrominance component. In some embodiments, in order to match the sampling rate of the luminance component to the sampling rate of the first chrominance component or the second chrominance component, an upsampling operation may be performed on the chrominance component (e.g., the first chrominance component or the second chrominance component) or a downsampling operation may be performed on the luminance component.

Specifically, the luminance component corresponding of several pixels may be divided into several sub-luminance component each of which corresponds to one pixel. The sampling rate of the sub-luminance component may be matched with the sampling rate of the chrominance component. The sub-luminance components, the first chrominance component, and/or the second chrominance component may be input the trained machine learning model through different input channels of the trained machine learning model. The sampling rate of each of the sub-luminance components, the first chrominance component, or the second chrominance component in each input channel may be matched with each other, and the sub-luminance components inputted by different input channels may be combined into one channel of an image through an inverse operation when they are output from the trained machine learning model.

In some embodiments, when a filtering operation on the initial image block is performed using the trained machine learning model, the filtering operation may be performed in multiple input channels of the trained machine learning model on the sub-luminance components and the chrominance component. In some embodiments, the sub-luminance components inputted by different input channels may be combined into one channel of an image through an inverse operation when they are output from the trained machine learning model. In some embodiments, different images corresponding to different input channels may be outputted from the trained machine learning model, and be superimposed into a channel, which is not limited herein.

In some embodiments, the performing the filtering operation on the initial image block by inputting the initial image block into the trained machine learning model may include: performing filtering operations on the luminance component and the chrominance component of different input channels, respectively; and outputting the filtered luminance component and the filtered chrominance component.

The reducing the size of the luminance component may include setting coordinates of the smallest unit (i.e., coordinates of a point at the upper left corner) of the luminance component Y in the YUV420 format as (x, y). Four pixels of luminance component of each smallest sampling unit in the YUV420 format in an original channel may be divided into four channels, and a pixel position of the luminance component Y in each divided channel may be (x, y). As shown in FIG. 6, the four luminance components Y at the upper left corner may be divided to generate four channels 620 including a channel 621, a channel 622, a channel 623, and a channel 624, and a pixel position of the luminance component Y in each divided channel (e.g., the channel 621, 622, 623, or 624) may be the same as the position of the smallest unit 610 of the luminance component Y.

The increasing the size of the chrominance component may include adjusting the size of the chrominance component (e.g., a first chrominance component U or a second chrominance component V) to be the same as the size of the luminance component Y by upsampling (e.g., interpolation, etc.) the chrominance component, combining a plurality of channels (e.g., including 4 channels generated by dividing the luminance component Y, a channel 5 (the first chrominance component U), and a channel 6 (the second chrominance component V)) together, inputting the combined channel into the trained machine learning model, and adjusting the size of the chrominance component to be an original size of the chrominance component before upsampling by downsampling after being filtered by the trained machine learning model.

In some embodiments, the size of the initial image block may need to be expanded based on a size of a convolution kernel, a convolution step size, and a count of convolution kernel layers in the trained machine learning model. In other words, for different training machine learning model and/or different initial image blocks, the expanding processes on the different initial image blocks may be different. The convolution kernel may be a multi-dimensional matrix. For example, a size of the convolution kernel may be N*M, wherein N and M may be the same or different. Parameters in the multi-dimensional matrix may be used to perform a convolution operation on the initial image block. The convolution step size may refer to a count of pixels to be skipped during selecting pixels for convolutional operation. The convolution operation may be a linear operation. For a certain image block (e.g., the initial image block) of a reconstructed image, pixels in the reconstructed image that around the certain image block may be obtained first when expanding the edge of the certain image block. If the pixels in the reconstructed image are not obtained, pixels closest to the pixels to be filled may be used for filling. In some embodiments, the closest pixels may have a strong correlation with the certain image block. In some embodiments, the closest pixels may include pixels adjacent to the pixels to be filled in a frame adjacent to the reconstructed image in time, and the values of the luminance component and chrominance component may be similar to those of the adjacent pixels, which may be obtained through inter-frame prediction. In some embodiments, the closest pixels may include pixels adjacent to the pixels to be filled in the certain image block, and the values of the luminance component and chrominance component may be similar to those of the adjacent pixels, which may be obtained through intra-frame prediction. More descriptions for expanding the initial image block may be found elsewhere in the present disclosure (e.g., FIG. 7 and the descriptions thereof).

Figure 7:
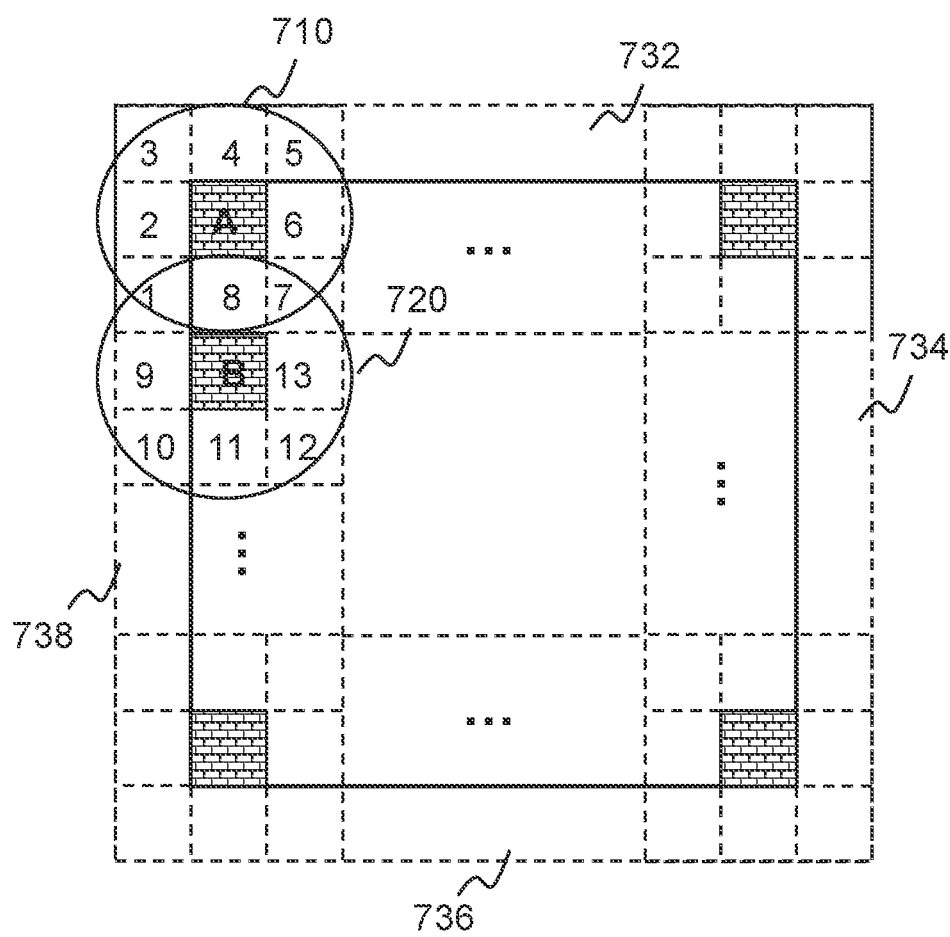
FIG. 7 is a schematic diagram of expanding an initial image block according to some embodiments of the present disclosure.

FIG. 7 is a schematic diagram of expanding an image block according to some embodiments of the present disclosure. The image block (e.g., an initial image block) may be expanded based on a size of a convolution kernel, a convolution step size, and/or a count of convolution kernel layers in a trained machine learning model.

As shown in FIG. 7, the convolution kernel of the trained machine learning model may be 3*3, the convolution step size of the trained machine learning model may be 1, and the count of the convolution kernel layers of the trained machine learning model may be 1. For an image block having a size of 128*128 and including grays pixels, when convolving a current gray pixel A, pixels 1-8 in the circle 710 may be needed around the current gray pixel A. That is, the current gray pixel A may be a center point of the convolution kernel, and pixels 1-5 may need to be filled. Similarly, when convolving a current gray pixel B, pixels 1, 8, 7, and 9-13 in the circle 720 may be needed around the current gray pixel B. That is, the current gray pixel B may be a center point of the convolution kernel, and pixels 1, 9, and 10 may need to be filled. As a result, the image block may be expanded by one row (e.g., row 732 or 736) or one column (e.g., column 734 or 738) of pixels (i.e., up and down by 1 row, and left and right by 1 column) around, and the size of the expanded image block may be 130*130.

Figure 8A:
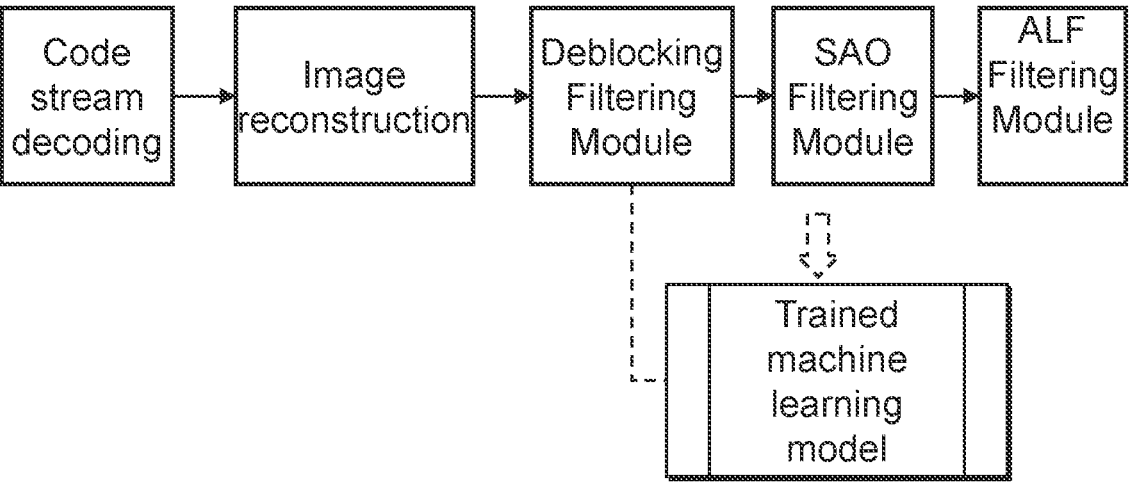
FIG. 8A and FIG. 8B illustrate two different embodiments in each which a trained machine learning model is applied to replace a filtering module according to some embodiments of the present disclosure.
Figure 8B:
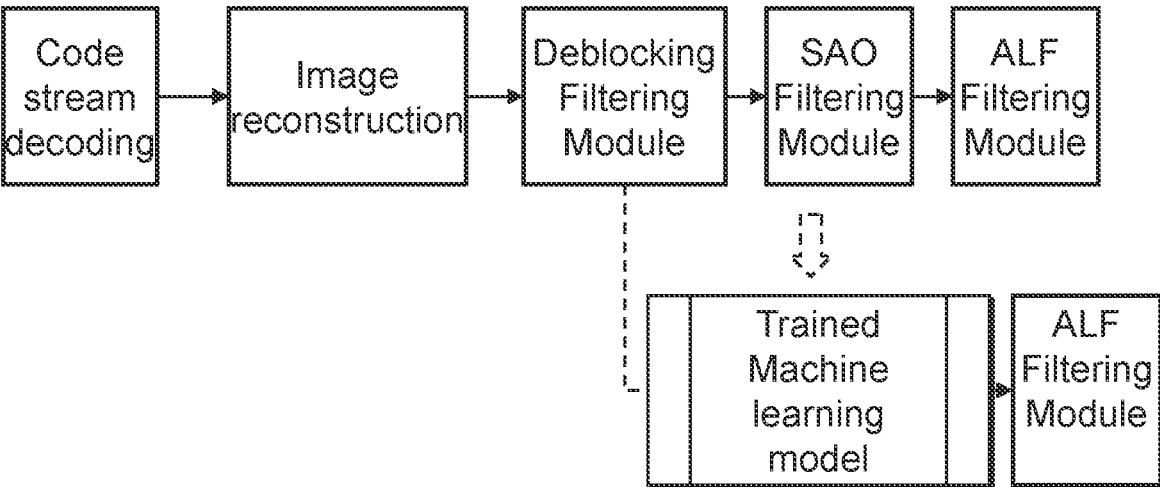

FIG. 8A and FIG. 8B illustrate two different embodiments in each of which a trained machine learning model is applied as a filtering module. In some embodiments, the trained machine learning model may be regarded as or replace a filtering module. One or more existing filtering modules may be replaced by the trained machine learning model. In some embodiments, the trained machine learning model may be inserted into an entire filtering process as an additional optional filtering module.

In the filtering process shown in FIG. 8A, the trained machine learning model may be used as a SAO filtering module and an ALF filtering module to achieve the functions of the SAO filtering module and the ALF filtering module. In the filtering process shown in FIG. 8B, the SAO filtering module may be replaced with the trained machine learning model to achieve the function of the SAO filtering module.

In some embodiments, during the entire filtering process, the trained machine learning model may be flexibly used as a replacement or additional optional filtering module, thereby satisfying the requirements of the image filtering process in different situations.

In some embodiments, whether to apply the at least one trained machine learning model to an image (e.g., the initial image block in FIG. 2) may be controlled by a syntax switch.

As used herein, the syntax switch may refer to a switch provided to each frame or each maximum coding unit during the use of the trained machine learning model. The syntax switch may be configured to control whether the trained machine learning model can be used to the current frame or the current maximum coding unit. The syntax switch may be transmitted as a syntactic element.

The syntax switch may be transmitted in a code stream as the syntactic element. For example, a logical value of 1 may be used to indicate that the at least one trained machine learning model may be applied to the initial image block, and a logical value of 0 may be used to indicate that the at least one trained machine learning model may not be applied to the initial image block. The encoder (e.g., the encoder 120) may determine whether to apply the at least one trained machine learning model to the initial image block, and send the corresponding syntactic element to the decoder (e.g., the decoder 140). The decoder may receive and read the syntactic element, and apply the at least one trained machine learning model to the initial image block if the logical value of 1 is recognized, or not apply the at least one trained machine learning model to the initial image block if the logical value of 0 is recognized.

In some embodiments, the image block filtered using the trained machine learning model may be coded based on pixel values (also be referred to as reconstructed pixel values) of the filtered image block (e.g., a candidate image block). The reconstructed pixel values of the filtered image block may be converted into multiple numbers that can be recognized by a computer. Specifically, a rate-distortion cost of the reconstructed pixel values after the filtering process (i.e., processed by the trained machine learning model) may be determined. The rate-distortion cost may be used to indicate a degree of distortion (also be referred to as a distortion degree) of the reconstructed pixel values. If the rate-distortion cost is large, the reconstructed pixel values may be considered to be severely distorted and the visual effect of a subsequently reconstructed image may be poor. If the rate-distortion cost is small, the reconstructed pixel values may be considered to be weak and the visual effect of the subsequently reconstructed image may be good. Whether the rate-distortion cost is less than a threshold or less than a rate-distortion cost of other filtering techniques may be determined. If the rate-distortion cost is less than the threshold or less than the rate-distortion cost of other filtering techniques, it may determine that the trained machine learning model can be applied to filter the image block.

Figure 9:
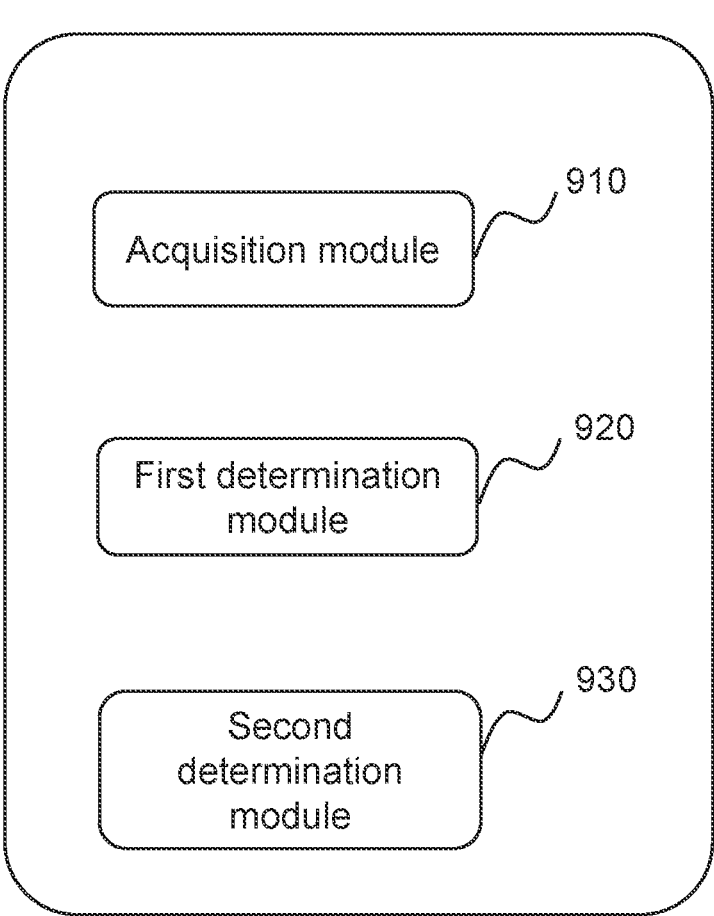
FIG. 9 is a block diagram illustrating an exemplary image filtering system according to some embodiments of the present disclosure.

FIG. 9 is a block diagram illustrating an exemplary image filtering system according to some embodiments of the present disclosure. As shown in FIG. 9, an image filtering system 900 may include an acquisition module 910, a first determination module 920, and a second determination module 930.

The acquisition module 910 may be configured to obtain an initial image block from a reconstructed image.

The first determination module 920 may be configured to determine at least one candidate image block by performing a filtering operation on the initial image block using at least one trained machine learning model. The at least one candidate image block may include at least one of a luminance component, a first chrominance component, or a second chrominance component.

The second determination module 930 may be configured to determine a target image block based on the at least one candidate image block.

The modules in the image filtering system 600 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. In some embodiments, two or more of the modules may be combined as a single module, and any one of the modules may be divided into two or more units.

Figure 10:
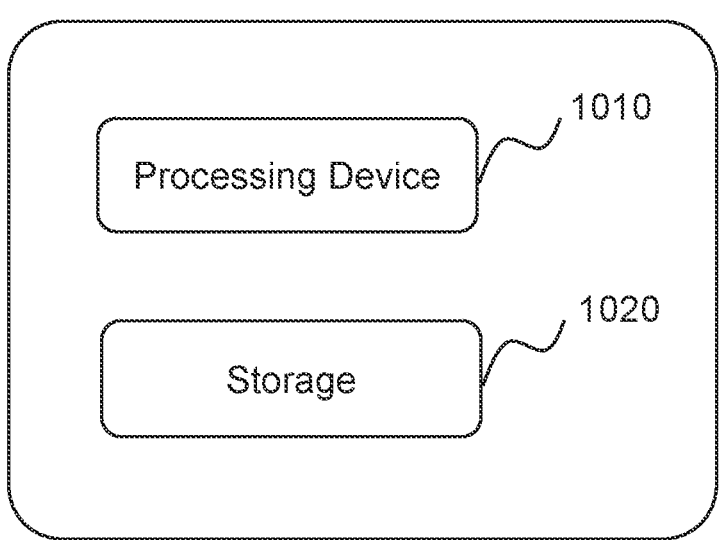
FIG. 10 is a block diagram illustrating an exemplary image filtering device according to some embodiments of the present disclosure.

FIG. 10 is a block diagram illustrating an exemplary image filtering device according to some embodiments of the present disclosure. The image filtering device may include a processing device 1010 and a storage 1020.

In some embodiments, the processing device 1010 may obtain an initial image block from a reconstructed image. In some embodiments, the processing device 1010 may determine at least one candidate image block by performing a filtering operation on the initial image block using at least one trained machine learning model. The at least one candidate image block may include at least one of a luminance component, a first chrominance component, or a second chrominance component. In some embodiments, the processing device 1010 may determine a target image block based on the at least one candidate image block. More descriptions regarding the filtering operation may be found elsewhere in the present disclosure (e.g., FIG. 1 and the descriptions thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method, comprising:
obtaining an initial image block from a reconstructed image;
determining at least one candidate image block by performing a filtering operation on the initial image block using at least one trained machine learning model; and
determining a target image block based on the at least one candidate image block,
wherein before performing a filtering operation on the initial image block using at least one trained machine learning model, the method includes:
obtaining a size of a convolution kernel, a convolution step size, and a count of convolution kernel layers in the at least one trained machine learning model; and
expanding a size of the initial image block based on the size of the convolution kernel, the convolution step size, and the count of convolution kernel layers in the at least one trained machine learning model.

2. The method of claim 1, wherein the expanding a size of the initial image block includes:
expanding the size of the initial image block using pixels in the reconstructed image that around the initial image block; or
in response to determining that the pixels in the reconstructed image that around the initial image block are not obtained, expanding the size of the initial image block using pixels of the initial image block closest to pixels to be filled.

3. The method of claim 1, wherein the initial image block includes at least two of a luminance component, a first chrominance component, or a second chrominance component, and the at least one trained machine learning model includes:
a first model configured to, in response to determining that the initial image block is composed of the luminance component, the first chrominance component, and the second chrominance component, output a luminance component of the at least one candidate image block;
a second model configured to, in response to determining that the initial image block is composed of the luminance component and the first chrominance component, output a first chrominance component of the at least one candidate image block; and
a third model configured to, in response to determining that the initial image block is composed of the luminance component and the second chrominance component, output a second chrominance component of the at least one candidate image block.

4. The method of claim 3, wherein the initial image block includes the luminance component, the first chrominance component, and the second chrominance component, and the at least one trained machine learning model is configured to output the luminance component, the first chrominance component, and the second chrominance component of the at least one candidate image block.

5. The method of claim 3, wherein the method further includes:
dividing the luminance component of the initial image block into multiple sub-luminance components; and
inputting the multiple sub-luminance components into one or more input channels of the at least one trained machine learning model, wherein a sampling rate of each of the multiple sub-luminance components matches with a sampling rate of the first chrominance component or the second chrominance component of the initial image block.

6. The method of claim 3, wherein the method further includes:
upsampling the first chrominance component and the second chrominance component of the initial image block so that a sampling rate of the first chrominance component and the second chrominance component of the initial image block matches a sampling rate of the luminance component of the initial image block; or
downsampling the luminance component of the initial image block so that the sampling rate of the luminance component of the initial image block matches the sampling rate of the first chrominance component or the second chrominance component of the initial image block.

7. The method of claim 1, wherein the at least one trained machine learning model includes:
at least one first convolution unit configured to determine a first characteristic image block based on the initial image block;
at least one connection unit configured to determine a second characteristic image block by processing the first characteristic image block and connecting, through a residual connection, an input and an output of the at least one connection unit; and at least one second convolution unit configured to determine a third characteristic image block based on the second characteristic image block, wherein the at least one candidate image block is generated by connecting, through the residual connection, the third characteristic image block and the initial image block.

8. The method of claim 7, wherein the at least one connection unit includes at least one third convolution unit.

9. The method of claim 7, wherein the connecting, through the residual connection, the third characteristic image block and the initial image block includes:

determining a scaling factor; and connecting, through the residual connection, the third characteristic image block and the initial image block based on the scaling factor.

10. The method of claim 9, wherein the determining the scaling factor includes:

determining the scaling factor by comparing costs of a plurality of candidate factors.

11. The method of claim 1, wherein the at least one trained machine learning model is determined based on an image quality parameter.

12. The method of claim 11, wherein the image quality parameter includes a quantization parameter (QP).

13. The method of claim 1, wherein whether to apply the at least one trained machine learning model to the initial image block is included in a syntax switch.

14. A method for image coding, comprising:

obtaining pixel values of a current image block;

filtering the pixel values of the current image block using at least one trained machine learning model; and coding the current image block with a syntax switch that controls whether the at least one trained machine learning model is applied to the current image block based on the filtered pixel values, wherein the at least one trained machine learning model includes:

at least one first convolution unit configured to determine a first characteristic image block based on the current image block;

at least one connection unit configured to determine a second characteristic image block by processing the first characteristic image block and connecting, through a residual connection, an input and an output of the at least one connection unit; and at least one second convolution unit configured to determine a third characteristic image block based on the second characteristic image block wherein a filtered current image block is generated by connecting, through the residual connection, the third characteristic image block and the current image block.

15. The method of claim 14, wherein the coding the current image block includes:

determining a rate-distortion cost of the filtered pixel values of the current image block; and in response to a determination that the rate-distortion cost is less than a threshold or less than a rate-distortion cost of other filtering techniques, assigning a value indicating that the at least one trained machine learning model is applied to filter the current image block to the switch syntax.

16. A system, comprising:

at least one storage device storing executable instructions for image filtering; and at least one processor in communication with the at least one storage device, wherein when executing the executable instructions, the at least one processor is configured to cause the system to perform operations including:

obtaining an initial image block from a reconstructed image;

determining at least one candidate image block by performing a filtering operation on the initial image block using at least one trained machine learning model; and determining a target image block based on the at least one candidate image block, wherein the initial image block includes at least two of a luminance component, a first chrominance component, or a second chrominance component, and the at least one trained machine learning model includes:

a first model configured to, in response to determining that the initial image block is composed of the luminance component, the first chrominance component, and the second chrominance component, output a luminance component of the at least one candidate image block;

a second model configured to, in response to determining that the initial image block is composed of the luminance component and the first chrominance component, output a first chrominance component of the at least one candidate image block; and a third model configured to, in response to determining that the initial image block is composed of the luminance component and the second chrominance component, output a second chrominance component of the at least one candidate image block.

17. The system of claim 16, wherein before performing a filtering operation on the initial image block using at least one trained machine learning model, the at least one processor is configured to cause the system to perform operations including:

obtaining a size of a convolution kernel, a convolution step size, and a count of convolution kernel layers in the at least one trained machine learning model; and expanding a size of the initial image block based on the size of the convolution kernel, the convolution step size, and the count of convolution kernel layers in the at least one trained machine learning model.

18. The system of claim 17, wherein the expanding a size of the initial image block includes:

expanding the size of the initial image block using pixels in the reconstructed image that around the initial image block; or in response to determining that the pixels in the reconstructed image that around the initial image block are not obtained, expanding the size of the initial image block using pixels of the initial image block closest to pixels to be filled.

19. The system of claim 16, wherein the initial image block includes the luminance component, the first chrominance component, and the second chrominance component, and the at least one trained machine learning model is configured to output the luminance component, the first chrominance component, and the second chrominance component of the at least one candidate image block.

20. The system of claim 16, wherein the at least one processor is further configured to cause the system to perform operations including:

dividing the luminance component of the initial image block into multiple sub-luminance components; and inputting the multiple sub-luminance components into one or more input channels of the at least one trained machine learning model, wherein a sampling rate of each of the multiple sub-luminance components matches with a sampling rate of the first chrominance component or the second chrominance component of the initial image block.

* * * * *